US009519682B1

(12) United States Patent
Pujara et al.

(10) Patent No.: US 9,519,682 B1
(45) Date of Patent: Dec. 13, 2016

(54) USER TRUSTWORTHINESS

(75) Inventors: Jay Pujara, Berwyn Heights, MD (US); Vishwanath Tumkur Ramarao, Sunnvyvale, CA (US); Xiaopeng Xi, Fremont, CA (US); Martin Zinkevich, Santa Clara, CA (US); Anirban Dasgupta, Albany, CA (US); Belle Tseng, Cupertino, CA (US); Wei Chu, San Jose, CA (US); Jyh-Shin Gareth Shue, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 60 days.

(21) Appl. No.: 13/117,037

(22) Filed: May 26, 2011

(51) Int. Cl.
| | |
|---|---|
| *G06F 11/00* | (2006.01) |
| *G06F 17/30* | (2006.01) |
| *G06Q 10/10* | (2012.01) |
| *H04H 20/28* | (2008.01) |
| *H04H 60/82* | (2008.01) |
| *G06F 12/14* | (2006.01) |

(52) U.S. Cl.
CPC ........... *G06F 17/3053* (2013.01); *G06Q 10/10* (2013.01); *H04H 20/28* (2013.01); *H04H 60/82* (2013.01)

(58) Field of Classification Search
CPC .... H04L 63/105; H04L 9/3265; H04L 63/064; H04L 63/0236; H04L 63/1425; G06F 15/16; G06F 15/173; G06F 21/00; G06F 17/30964; G06F 17/3053; H04H 20/28; H04H 60/76; H04H 60/82; H04H 60/91
USPC .................... 726/22; 709/206, 209
See application file for complete search history.

(56) References Cited

U.S. PATENT DOCUMENTS

| | | | |
|---|---|---|---|
| 6,052,709 A | 4/2000 | Paul | |
| 6,393,465 B2 | 5/2002 | Leeds | |
| 6,421,709 B1 | 7/2002 | McCormick et al. | |
| 6,453,327 B1 * | 9/2002 | Nielsen | ......................... 715/205 |
| 6,643,686 B1 | 11/2003 | Hall | |

(Continued)

OTHER PUBLICATIONS

Silaghi, G. C. et al., "Reputation-Based Trust Management System and Their Applicability to Grids," CoreGRID Technical Report Number TR-0064, Feb. 23, 2007, pp. 1-26.

(Continued)

*Primary Examiner* — Linglan Edwards
*Assistant Examiner* — Gary Gracia
(74) *Attorney, Agent, or Firm* — James J. DeCarlo; Greenberg Traurig LLP

(57) ABSTRACT

Embodiments are directed towards generating a unified user account trustworthiness system through user account trustworthiness scores. A trusted group of user accounts may be identified for a given action by grouping a plurality of user accounts into tiers based on a trustworthiness score of each user account for the given action. The tiers and/or trustworthiness scores may be employed to classify an item, such as a message as spam or non-spam, based on input from the user accounts. The trustworthiness scores may also be employed to determine if a user account is a robot account or a human account. The trusted group for a given action may dynamically evolve over time by regrouping the user accounts based on modified trustworthiness scores. A trustworthiness score of an individual user account may be modified based on input received from the individual user account and input from other user accounts.

17 Claims, 8 Drawing Sheets

(56) References Cited

U.S. PATENT DOCUMENTS

| | | |
|---|---|---|
| 6,650,890 B1 | 11/2003 | Irlam et al. |
| 6,772,196 B1 | 8/2004 | Kirsch et al. |
| 6,779,021 B1 | 8/2004 | Bates et al. |
| 6,957,259 B1 | 10/2005 | Malik |
| 7,181,764 B2 | 2/2007 | Zhu et al. |
| 7,315,826 B1 | 1/2008 | Guheen et al. |
| 7,373,385 B2 | 5/2008 | Prakash |
| 7,644,063 B2 | 1/2010 | Bossman |
| 7,664,819 B2 | 2/2010 | Murphy et al. |
| 7,694,221 B2 | 4/2010 | Fortes |
| 7,720,853 B1 | 5/2010 | Siegel et al. |
| 7,818,678 B2 | 10/2010 | Massand |
| 7,822,631 B1* | 10/2010 | Vander Mey et al. ........ 705/7.29 |
| 7,840,576 B1 | 11/2010 | Siegel et al. |
| 7,865,590 B2 | 1/2011 | Zalewski |
| 7,937,468 B2 | 5/2011 | Libbey |
| 7,996,897 B2 | 8/2011 | Ramarao |
| 8,359,225 B1* | 1/2013 | Seth ............................. 705/7.29 |
| 8,554,601 B1* | 10/2013 | Marsh ................... G06Q 30/02 |
| | | 705/7.32 |
| 8,656,463 B2* | 2/2014 | Callahan et al. ................. 726/4 |
| 2003/0001890 A1 | 1/2003 | Brin |
| 2003/0051026 A1 | 3/2003 | Carter et al. |
| 2003/0088627 A1 | 5/2003 | Rothwell et al. |
| 2003/0191969 A1 | 10/2003 | Katsikas |
| 2004/0008990 A1 | 1/2004 | Uno |
| 2004/0019650 A1 | 1/2004 | Auvenshine |
| 2004/0093384 A1 | 5/2004 | Shipp |
| 2004/0156530 A1 | 8/2004 | Brodsky et al. |
| 2004/0167964 A1 | 8/2004 | Rounthwaite et al. |
| 2004/0177110 A1 | 9/2004 | Rounthwaite et al. |
| 2004/0177120 A1 | 9/2004 | Kirsch |
| 2004/0216034 A1 | 10/2004 | Lection et al. |
| 2004/0255122 A1 | 12/2004 | Ingerman et al. |
| 2004/0267893 A1 | 12/2004 | Lin |
| 2005/0060643 A1 | 3/2005 | Glass et al. |
| 2005/0091320 A1 | 4/2005 | Kirsch et al. |
| 2005/0102366 A1 | 5/2005 | Kirsch |
| 2005/0198508 A1 | 9/2005 | Beck |
| 2006/0015563 A1 | 1/2006 | Judge et al. |
| 2006/0015942 A1 | 1/2006 | Judge et al. |
| 2006/0031303 A1 | 2/2006 | Pang |
| 2006/0036748 A1 | 2/2006 | Nusbaum et al. |
| 2006/0064755 A1 | 3/2006 | Azadet et al. |
| 2006/0106700 A1 | 5/2006 | Boren et al. |
| 2006/0106743 A1 | 5/2006 | Horvitz |
| 2006/0123348 A1 | 6/2006 | Ross et al. |
| 2006/0149821 A1 | 7/2006 | Rajan et al. |
| 2006/0168017 A1 | 7/2006 | Stern et al. |
| 2006/0168024 A1 | 7/2006 | Mehr et al. |
| 2006/0195461 A1 | 8/2006 | Lo et al. |
| 2006/0212925 A1* | 9/2006 | Shull et al. .......................... 726/1 |
| 2006/0212931 A1* | 9/2006 | Shull et al. ........................ 726/10 |
| 2006/0251068 A1 | 11/2006 | Judge et al. |
| 2006/0253578 A1 | 11/2006 | Dixon et al. |
| 2006/0253579 A1 | 11/2006 | Dixon et al. |
| 2006/0253580 A1 | 11/2006 | Dixon et al. |
| 2006/0253581 A1 | 11/2006 | Dixon et al. |
| 2006/0253582 A1 | 11/2006 | Dixon et al. |
| 2006/0253583 A1 | 11/2006 | Dixon et al. |
| 2006/0253584 A1 | 11/2006 | Dixon et al. |
| 2006/0267802 A1 | 11/2006 | Judge et al. |
| 2007/0027992 A1 | 2/2007 | Judge et al. |
| 2007/0078699 A1 | 4/2007 | Scott et al. |
| 2007/0112761 A1* | 5/2007 | Xu et al. ............................ 707/5 |
| 2007/0121843 A1 | 5/2007 | Atazky et al. |
| 2007/0130350 A1 | 6/2007 | Alperovitch et al. |
| 2007/0130351 A1 | 6/2007 | Alperovitch et al. |
| 2007/0136178 A1* | 6/2007 | Wiseman et al. ................ 705/37 |
| 2007/0156886 A1* | 7/2007 | Srivastava ........... G06Q 10/109 |
| | | 709/224 |
| 2007/0192855 A1 | 8/2007 | Hulten et al. |
| 2007/0195779 A1 | 8/2007 | Judge et al. |
| 2007/0214506 A1 | 9/2007 | Rao et al. |
| 2007/0240217 A1 | 10/2007 | Tuvell et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240221 A1 | 10/2007 | Tuvell et al. |
| 2007/0240222 A1 | 10/2007 | Tuvell et al. |
| 2007/0294281 A1 | 12/2007 | Ward |
| 2007/0294339 A1 | 12/2007 | Ala-Kleemola et al. |
| 2007/0299916 A1* | 12/2007 | Bates et al. .................... 709/206 |
| 2008/0015925 A1* | 1/2008 | Sundaresan .......... G06Q 10/063 |
| | | 705/7.11 |
| 2008/0022384 A1* | 1/2008 | Yee ...................... H04L 63/0263 |
| | | 726/11 |
| 2008/0082662 A1 | 4/2008 | Dandliker et al. |
| 2008/0109491 A1* | 5/2008 | Gupta .................... G06Q 10/10 |
| 2008/0137550 A1 | 6/2008 | Jurca et al. |
| 2008/0162265 A1* | 7/2008 | Sundaresan ....... G06F 17/30867 |
| | | 707/781 |
| 2008/0175266 A1* | 7/2008 | Alperovitch .......... G06F 21/554 |
| | | 370/465 |
| 2008/0184366 A1 | 7/2008 | Alperovitch et al. |
| 2008/0208621 A1 | 8/2008 | Karkanias et al. |
| 2008/0228574 A1 | 9/2008 | Stewart et al. |
| 2008/0243628 A1 | 10/2008 | Wiseman et al. |
| 2008/0243920 A1 | 10/2008 | Newman et al. |
| 2008/0244414 A1 | 10/2008 | Marcoullier et al. |
| 2009/0013041 A1* | 1/2009 | Farmer et al. ................. 709/204 |
| 2009/0024629 A1* | 1/2009 | Miyauchi ........................... 707/9 |
| 2009/0049041 A1* | 2/2009 | Tareen ............... G06F 17/3053 |
| 2009/0049408 A1 | 2/2009 | Naaman et al. |
| 2009/0064293 A1* | 3/2009 | Li et al. ............................ 726/6 |
| 2009/0089853 A1 | 4/2009 | Yoshioka |
| 2009/0092238 A1 | 4/2009 | Bouvier et al. |
| 2009/0132689 A1 | 5/2009 | Zaltzman |
| 2009/0157667 A1 | 6/2009 | Brougher et al. |
| 2009/0165128 A1 | 6/2009 | McNally et al. |
| 2009/0216859 A1* | 8/2009 | Dolling .................. G06Q 30/02 |
| | | 709/218 |
| 2009/0307313 A1* | 12/2009 | Wang et al. .................... 709/206 |
| 2010/0011071 A1* | 1/2010 | Zheleva .................. G06F 21/55 |
| | | 709/206 |
| 2010/0036969 A1 | 2/2010 | Perry et al. |
| 2010/0106560 A1* | 4/2010 | Li et al. ............................ 705/10 |
| 2010/0107244 A1* | 4/2010 | Li et al. ........................... 726/22 |
| 2010/0174793 A1* | 7/2010 | Wieneke et al. ............... 709/206 |
| 2010/0180180 A1* | 7/2010 | Bates et al. .................... 715/757 |
| 2010/0262706 A1* | 10/2010 | Rodriguez et al. ............ 709/229 |
| 2010/0274597 A1* | 10/2010 | Dill ........................ G06Q 30/02 |
| | | 705/7.29 |
| 2010/0306832 A1* | 12/2010 | Mu ..................... G06Q 20/3821 |
| | | 726/5 |
| 2011/0035789 A1* | 2/2011 | Callahan et al. ................. 726/4 |
| 2011/0158406 A1* | 6/2011 | Marcia et al. ................. 380/200 |
| 2011/0185436 A1* | 7/2011 | Koulinitch et al. ............ 726/28 |
| 2011/0191847 A1* | 8/2011 | Davis et al. .................... 726/22 |
| 2011/0246584 A1* | 10/2011 | Vitaldevara et al. ......... 709/206 |
| 2012/0011559 A1* | 1/2012 | Miettinen et al. ................ 726/1 |
| 2012/0047147 A1* | 2/2012 | Redstone ............ G06F 17/3087 |
| | | 707/748 |
| 2012/0209919 A1* | 8/2012 | Shah et al. ..................... 709/205 |
| 2012/0209970 A1* | 8/2012 | Scipioni ................ G06Q 30/06 |
| | | 709/223 |
| 2012/0254764 A1* | 10/2012 | Ayloo et al. ................... 715/738 |

OTHER PUBLICATIONS

Swamynathan, G. et al,, "Globally Decoupled Reputation for Large Distributed Networks," Advances in Multimedia, vol. 2007, 2007, pp. 1-14.

Jurca, R. et al., "Truthful Reputation Information in Electronic Markets without Independent Verification," Apr. 6, 2004, pp. 1-20.

Slashdot, FAQ—Comments and Moderation#cm600, Nov. 15, 2007, pp. 1-18 http://slashdotorg/fq/com-mod.shtml.

Flickr Community Guidelines, Nov. 15, 2007, pp. 1-3 http://flickr.com/guidelines.gne.

Craigslist Online community, craigslist help > flags and community moderation, http://www.craigslist.org/about/help/flags_and_community_moderation Nov. 7, 2007.

(56) References Cited

OTHER PUBLICATIONS

"Bloom Filter," Wikipedia, the free encyclopedia, 7 pages, May 22, 2007 http://en.wikipedia.org/wiki/Bloom_filter.
Dhamija, R "Security Skins: embedded, Unspoofable Security Indicators," Harvard University, Jun. 19, 2006, 57 pages.
Dhamija, R. et al., "Why Phishing Works," CHI 2006, Apr. 22-27, 2006, 10 pages.
Dhamija, R. et al., "The Battle Against Phishing: Dynamic Security Skins," Symposium on Usable Privacy and Security 2005, Jul. 6-8, 2005, 12 pages.
Registration Demonstration; Sign-In From New Device; Sign-in Demonstration, Jun. 13, 2006, 20 pages http://passmarksecurity.breezecentral.com/p70238971.
Kristol, D. et al., "HTTP: State Management Mechanism," Network Working Group, RFC 2109, Feb. 1997, 21 pages.
Taylor, B., "Sender Reputation in a Large Webmail Service," CEAS 2006—Third conference on Email and Anti-Spam, Google, Inc., Jul. 27-28, 6 pages.
Taylor, B., "Sender Repotation in a Large Webmail Service CEAS 2006," Google, Inc., Jul. 27, 2006, 19 pages.
Zacharia, "Collaboratve Reputation Mechanisms for Electronic Marketplaces," 2000.
International Search Report and Written Opinion for International Patent Application No. PCT/US2008/080154 mailed May 18, 2009.
International Search Repon for International Patent Application No. PCT/US2005/026069 mailed Feb. 21, 2007.
Official Communication for U.S. Appl. No. 11/941,009 mailed Feb. 17, 2011.
Official Communication for U.S. Appl. No. 11/941,009 mailed Aug. 4, 2011.
Official Communication for U.S. Appl. No. 11/941,009 mailed Oct. 17, 2011.
Official Communication for U.S. Appl. No. 12/011,114 mailed Jan. 13, 2011.
Official Communication for U.S. Appl. No. 12/011,114 mailed May 5, 2011.
Official Communication for U.S. Appl. No. 12/011,114 mailed Jun. 25, 2009.
Official Communication for U.S. Appl. No. 11/774,460 mailed Dec. 18, 2009.
Official Communication for U.S. Appl. No. 11/774,460 mailed May 13, 2010.
Official Communication for U.S. Appl. No. 11/774,460 mailed Dec. 23, 2010.
Official Communication for U.S. Appl. No. 11/774,460 mailed Sep. 2, 2009.
Official Communication for U.S. Appl. No. 11/945,911 mailed Apr. 7, 2010.
Official Communication for U.S. Appl. No. 11/945,911 mailed Jun. 3, 2010.
Official Communication for U.S. Appl. No. 11/945,911 mailed Jul. 16, 2010.
Official Communication for U.S. Appl. No. 11/945,911 mailed Dec. 7, 2010.

\* cited by examiner

USER TRUSTWORTHINESS

TECHNICAL FIELD

Embodiments relate generally to determining a trustworthiness of a user account and, more particularly, but not exclusively to generating and evolving one or more trustworthiness scores for each of a plurality of user accounts, to generate at least one group of user accounts determined to have a defined level of trust.

BACKGROUND

The problem of spam in established communication technologies, such as electronic mail, is well-recognized. Spam may include unsolicited messages sent by a computer over a network to a large number of recipients. In some cases, spam messages may be sent to a targeted user or targeted domain, for malicious, disruptive, or abusive purposes. For example, a spammer might send messages in bulk to a particular domain to exhaust its resources. Therefore, it may be beneficial to determine whether or not a message is spam and filter it accordingly. However, it may be difficult to determine whether or not a message is spam based on the sender and/or content of the message. One possible way of determining if a message is spam may be through an anti-spam system. These anti-spam systems may use user feedback to determine if the message is spam or not and filter it accordingly.

One possible problem with user feedback is that the user may not always be truthful or accurate as to whether the message is actually spam or not. For example, a user might signup for a distribution list that sends coupon messages to users. At some later date, the user may decide that he or she does not want to receive coupon messages anymore and may mark a coupon message as spam. Although the coupon message may be unwanted by that user, it may not be spam to other users who sign up for the distribution list. Therefore, the anti-spam system may receive inaccurate user feedback from some users. Similarly, some inaccurate user feedback may come from the spammers themselves. In some situations, spammers may hire humans and/or create robot accounts to provide inaccurate feedback in an attempt to misguide an anti-spam system so that a spam message is treated as non-spam. Thus, it is with respect to these considerations and others that the present invention has been made.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding, reference will be made to the following Detailed Description, which is to be read in association with the accompanying drawings, wherein.

DETAILED DESCRIPTION

Figure 1:
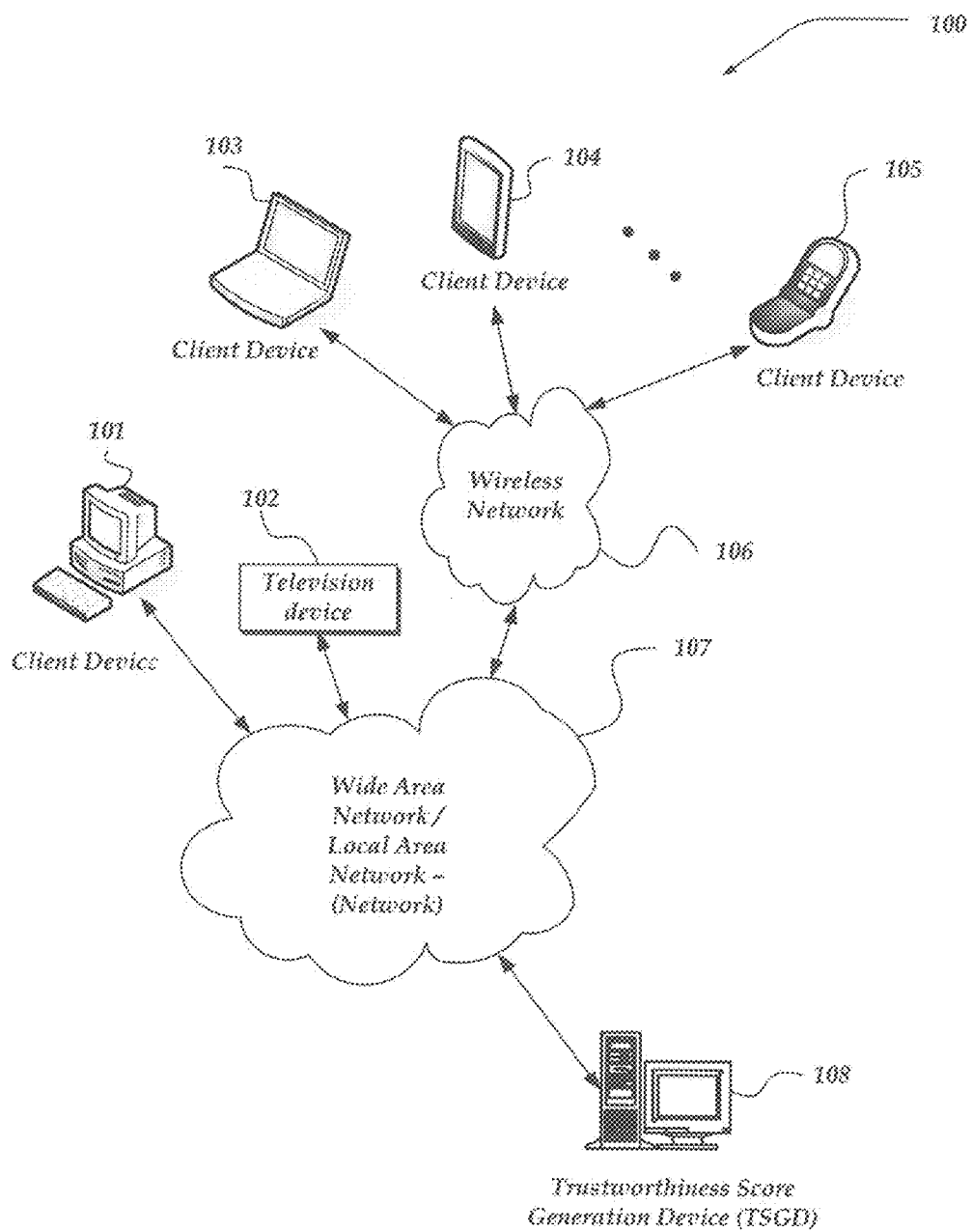
FIG. 1 is a system diagram of an environment in which embodiments may be implemented.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "features" refers to any of a variety of information relating to a user account's usage of the internet. Features may include dynamic behavioral features and/or static profile features. Dynamic behavioral features may include internet browsing data (such as number of page views and/or clicks, websites visited, or the like), email transactions (such as number of logins, number of messages sent and/or received, or the like), address book entries, or the like. Static profile features may include user account registration information, such as user preferences, age of a user, gender of a user, occupation of a user, or the like.

As used herein, the term "action" refers to an online activity that is performed by a user of a user account. Actions may include sending messages, providing feedback on messages, providing comments, uploading content, or the like. In some embodiments, an action may include multiple sub-actions, such as managing a message account that includes sending message, providing feedback, or the like.

As used herein, the term "item" refers to an article on the internet that can have an action performed on it. Items may include messages, media content, comments, postings, or the like.

As used herein, the phrase "editorial feedback sample set" refers to a collection of inputs from a subset of user accounts used to determine an accuracy of a classifier for generating trustworthiness scores for a given action.

As used herein, the terms "machine-learning" and "classifier" refer to any of a variety of machine implemented algorithms that are employed to evolve behaviors based on input data, including, for example, recognizing complex patterns and making intelligent decisions based on the input data, including, such as pattern recognition, classification, and similar actions. Thus, machine-learning algorithms include decision trees, neural networks, support vector machine algorithms, clustering, Bayesian networks, inductive logic programming, and so forth.

The following briefly describes embodiments in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards generating a unified user account trustworthiness system employable for use with a sender reputation, voter reputation, and/or collaborative filtering through user account trustworthiness scores. For example, the trustworthiness scores may be employed to determine if an item, such as a message, is spam or non-spam. One or more trustworthiness scores may be generated for each user account, where each trustworthiness score may be associated with a different action. For example, trustworthiness scores can provide an indication of how trustworthy a user account is to perform a particular action, such as, sending messages, providing feedback on messages, providing comments, uploading content, or the like. In one embodiment, trustworthiness scores for a given action may be generated by employing a classifier trained using a feature set from a training set of user accounts and, in some embodiments, one or more other trustworthiness scores for different actions.

A trusted group of user accounts may be identified for a given action by grouping a plurality of user accounts into tiers based on each user account's trustworthiness score for the given action. In one embodiment, the trusted group may be identified by tiering the user accounts into groups for a given action. For example, user accounts may be tiered into a trusted group, a mid-tier group, and an untrusted group based on their respective trustworthiness score. Since each user account may be tiered for a given action and a user account can have multiple trustworthiness scores for different actions, each user account may be associated with a different tier with different trustworthiness scores for different actions. The tiers and/or trustworthiness scores may be employed to classify an item based on input from the user accounts. In one embodiment, feedback from the trusted group of user accounts may be used to classify a message as spam. In another embodiment, trustworthiness scores may be employed to classify a user account as a human account or a robot (bot) account, a trusted account to send messages or not, a trusted to upload content or no, or the like. In yet another embodiment, trustworthiness scores may be employed to determine a likelihood that a user of a corresponding user account may access, respond, and/or forward a given advertisement.

The unified trustworthiness system may be configured as an evolving system based on community moderation. That is, a trustworthiness score of an individual user account for a given action may vary over time. In one embodiment, a trustworthiness score of an individual user account may change based on input received from the individual user account and input from other user accounts. For example, if a user account provides feedback on a message, then a trustworthiness score of the user account may be modified based on a comparison of the feedback provided by the user account to feedback provided by other user accounts. The user accounts may be regrouped/re-tiered based on the modified trustworthiness scores. Thus, as trustworthiness scores for a given action are modified, the trusted group for the given action may dynamically evolve by tiering the user accounts based on the modified and evolving trustworthiness scores. Therefore, user accounts may move in and out of the trusted group over time as trustworthiness scores are modified depending on the input from each user account. In one embodiment, a third source may be employed to further evolve trustworthiness scores. For example, in one embodiment, feedback from a spam filter, a scoring committee, or the like, may also be used to evolve trustworthiness scores.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")-(network) 107, wireless network 106, client devices 101-105, and Trustworthiness Score Generation Device (TSGD) 108.

One embodiment of client devices 101-105 is described in more detail below in conjunction with FIG. 2. Generally, however, client devices 103-105 may include virtually any portable computing device capable of receiving and sending a message over a network, such as network 107, wireless network 106, or the like. Client devices 103-105 may also be described generally as client devices that are configured to be portable. Thus, client devices 103-105 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, client devices 103-105 typically range widely in terms of capabilities and characteristics. In one non-limiting example, a cell phone may have a numeric keypad and a few lines of monochrome liquid crystal display (LCD) on which only text may be displayed. In another example, a web-enabled mobile device may have a touch sensitive screen, a stylus, and several lines of color LCD in which both text and graphics may be displayed.

Client device 101 may include virtually any computing device capable of communicating over a network to send and receive information, including messaging, performing various online activities and/or actions, or the like. The set of such devices may include devices that typically connect using a wired or wireless communications medium such as personal computers, multiprocessor systems, microprocessor-based or programmable consumer electronics, network personal computers (PCs), or the like. In one embodiment, at least some of client devices 103-105 may operate over wired and/or wireless network. Client device 102 may include virtually any device useable as a television device. Today, many of these devices include a capability to access and/or otherwise communicate over a network such as network 107 and/or even wireless network 106. Moreover, client device 102 may access various computing applications, including a browser, or other web-based application.

A web-enabled client device may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like, to display and send a message. In one embodiment, a user of the client device may employ the browser application to perform various activities over a network (online). For example, the user of the client device may select to access webpages, access and manage a user message account, send messages, provide feedback on messages, post comments, provide ratings of online content, or the like. However, another application may also be used to perform various online activities.

For example, client devices 101-105 also may include at least one other client application that is configured to access and/or manage user message accounts, between another computing device. The client application may include a capability to provide and receive media content, textual content, graphical content, audio content, and the like. The client application may further provide information that identifies itself, including a type, capability, name, and the like. In one embodiment, client devices 101-105 may uniquely identify themselves through any of a variety of mechanisms, including a phone number, Mobile Identification Number (MIN), an electronic serial number (ESN), or other mobile device identifier. The information may also indicate a content format that the mobile device is enabled to employ. Such information may be provided in a network packet, or the like, sent between other client devices, TSGD 108, or other computing devices.

Client devices 101-105 may further be configured to include a client application that enables an end-user to log into an end-user account that may be managed by another computing device, such as TSGD 108, or the like. Such end-user account, in one non-limiting example, may be configured to enable the end-user to manage one or more actions, including in one non-limiting example, sending messages, providing feedback on messages, providing comments, uploading content, search activities, social networking activities, browse various websites, make purchases, sell products/services, communicate with other users, share attachments with others, or the like. However, participation in such online actions may also be performed without logging into the end-user account.

Wireless network 106 is configured to couple client devices 103-105 and its components with network 107. Wireless network 106 may include any of a variety of wireless sub-networks that may further overlay stand-alone ad-hoc networks, and the like, to provide an infrastructure-oriented connection for client devices 103-105. Such sub-networks may include mesh networks, Wireless LAN (WLAN) networks, cellular networks, and the like. In one embodiment, the system may include more than one wireless network.

Wireless network 106 may further include an autonomous system of terminals, gateways, routers, and the like connected by wireless radio links, and the like. These connectors may be configured to move freely and randomly and organize themselves arbitrarily, such that the topology of wireless network 106 may change rapidly.

Wireless network 106 may further employ a plurality of access technologies including 2nd (2G), 3rd (3G), 4th (4G), $5^{th}$ (5G) generation radio access for cellular systems, WLAN, Wireless Router (WR) mesh, and the like. Access technologies such as 2G, 3G, 4G and future access networks may enable wide area coverage for mobile devices, such as client devices 103-105 with various degrees of mobility. In one non-limiting example, wireless network 106 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 106 may include virtually any wireless communication mechanism by which information may travel between client devices 103-105 and another computing device, network, and the like.

Network 107 is configured to couple network devices with other computing devices, including, TSGD 108, client devices 101 and 102, and through wireless network 106 to client devices 103-105. Network 107 is enabled to employ any form of computer readable media for communicating information from one electronic device to another. Also, network 107 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 107 may be configured to transport information of an Internet Protocol (IP). In essence, network 107 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of TSGD 108 is described in more detail below in conjunction with FIG. 3. Briefly, however, TSGD 108 may include any computing device capable of connecting to network 107 to classify an item based on user account inputs from a trusted group of user accounts. In one embodiment, TSGD 108 may identify a trusted group of user accounts by generating trustworthiness scores for each user account for a given action.

In another embodiment, TSGD 108 may modify the trustworthiness score of each user account based on a comparison of input from a corresponding user account to input from other user accounts. The modified trustworthiness scores may then be utilized, such as by TSGD 108, to dynamically evolve the trusted group by regrouping the user accounts based on the modified trustworthiness scores.

Devices that may operate as TSGD 108 include various network devices, including, but not limited to personal computers, desktop computers, multiprocessor systems, microprocessor-based or programmable consumer electronics, network PCs, server devices, network appliances, and the like. It should be noted that while TSGD 108 is illustrated as a single network device, embodiments are not so limited. Thus, in another embodiment, TSGD 108 may be distributed across one or more distinct network devices. For example, in one embodiment, TSGD 108 may be implemented using a cloud architecture, being distributed over a plurality of network devices.

Moreover, TSGD 108 is not limited to a particular configuration. Thus, in one embodiment, TSGD 108 may operate using a master/slave approach over a plurality of network devices, where one of the plurality of network devices of TSGD 108 operates to manage and/or otherwise coordinate operations of the other network devices. In other embodiments, the TSGD 108 may operate as a plurality of network devices within a cluster architecture, a peer-to-peer architecture, and/or even within a cloud architecture. Thus, embodiments are not to be construed as being limited to a single environment, and other configurations, and architectures are also envisaged.

Illustrative Client Device

Figure 2:
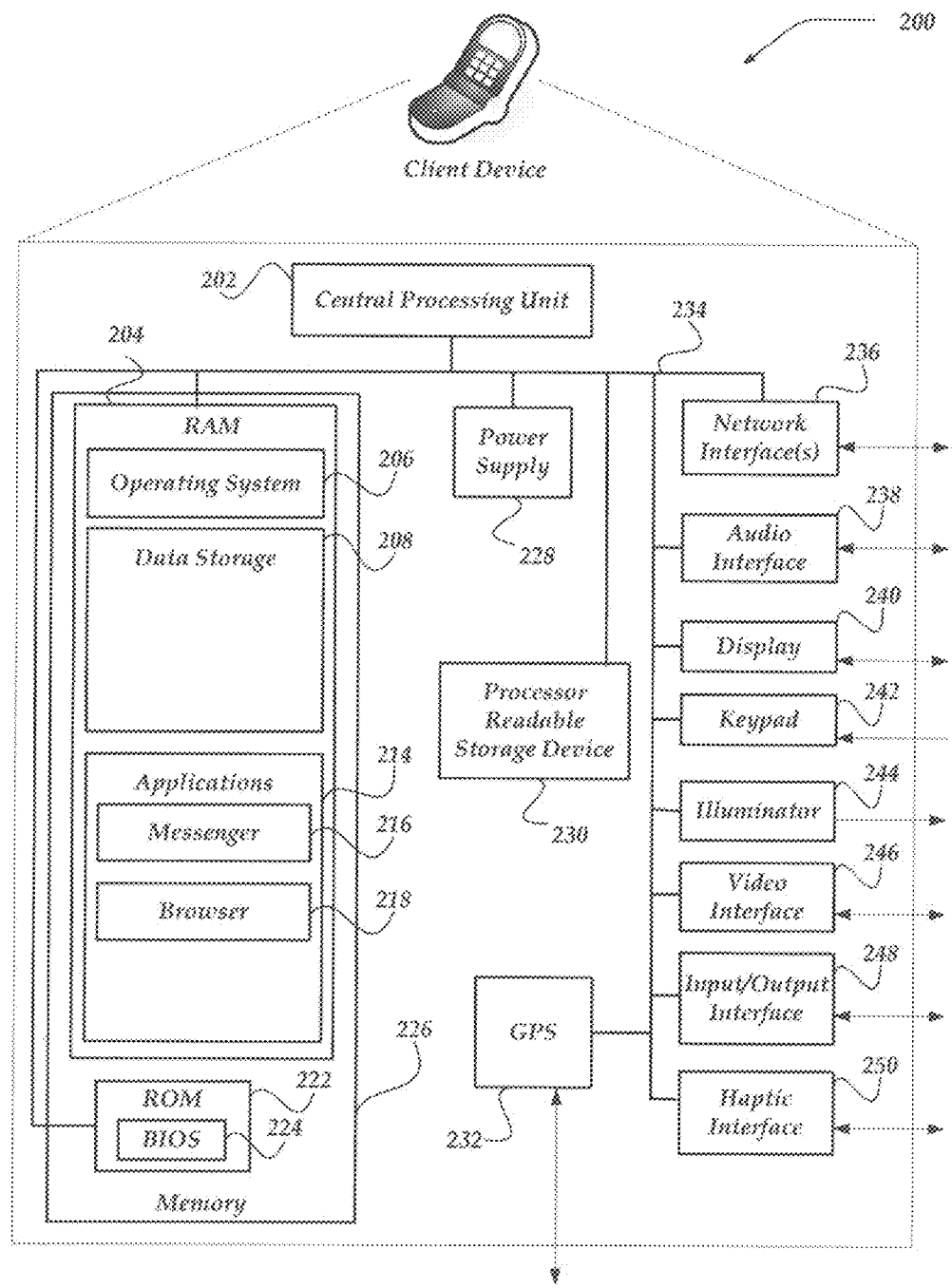
FIG. 2 shows an embodiment of a client device that may be included in a system such as that shown in FIG. 1.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, one embodiment of at least one of client devices 101-105 of FIG. 1.

As shown in the figure, client device 200 includes a processing unit (CPU) 202 in communication with a mass memory 226 via a bus 234. Client device 200 also includes a power supply 228, one or more network interfaces 236, an audio interface 238, a display 240, a keypad 242, an illuminator 244, a video interface 246, an input/output interface 248, a haptic interface 250, and an optional global positioning systems (GPS) receiver 232. Power supply 228 provides power to client device 200. A rechargeable or non-rechargeable battery may be used to provide power. The power may also be provided by an external power source, such as an AC adapter or a powered docking cradle that supplements and/or recharges a battery. And in one embodiment, although not shown, a gyroscope may be employed in client device 200 to measuring and/or maintaining an orientation of client device 200.

Client device 200 may optionally communicate with a base station (not shown), or directly with another computing device. Network interface 236 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), Short Message Service (SMS), general packet radio service (GPRS), WAP, ultra wide band (UWB), IEEE 802.16 Worldwide Interoperability for Microwave Access (WiMax), Session. Initiation Protocol/Real-time Transport Protocol (SIP/RTP), or any of a variety of other wireless communication protocols. Network interface 236 is sometimes known as a transceiver, transceiving device, or network interface card (NIC).

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action. Display 240 may be a liquid crystal display (LCD), gas plasma, light emitting diode (LED), or any other type of display used with a computing device. Display 240 may also include a touch sensitive screen arranged to receive input from an object such as a stylus or a digit from a human hand.

Video interface 246 may be arranged to capture video images, such as a still photo, a video segment, an infrared video, or the like. For example, video interface 246 may be coupled to a digital video camera, a web-camera, or the like. Video interface 246 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 242 may comprise any input device arranged to receive input from a user. For example, keypad 242 may include a push button numeric dial, or a keyboard. Keypad 242 may also include command buttons that are associated with selecting and sending images. Illuminator 244 may provide a status indication and/or provide light. Illuminator 244 may remain active for specific periods of time or in response to events. For example, when illuminator 244 is active, it may backlight the buttons on keypad 242 and stay on while the client device is powered. Also, illuminator 244 may backlight these buttons in various patterns when particular actions are performed, such as dialing another client device. Illuminator 244 may also cause light sources positioned within a transparent or translucent case of the client device to illuminate in response to actions.

Client device 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like. Haptic interface 250 is arranged to provide tactile feedback to a user of the client device. For example, the haptic interface 250 may be employed to vibrate client device 200 in a particular way when another user of a computing device is calling.

Optional GPS transceiver 232 can determine the physical coordinates of client device 200 on the surface of the Earth, which typically outputs a location as latitude and longitude values. GPS transceiver 232 can also employ other geo-positioning mechanisms, including, but not limited to, triangulation, assisted GPS (AGPS), Enhanced Observed Time Difference (E-OTD), Cell Identifier (CI), Service Area Identifier (SAD, Enhanced Timing Advance (ETA), Base Station Subsystem (BSS), or the like, to further determine the physical location of client device 200 on the surface of the Earth. It is understood that under different conditions, GPS transceiver 232 can determine a physical location within millimeters for client device 200; and in other cases, the determined physical location may be less precise, such as within a meter or significantly greater distances. In one embodiment, however, mobile device 200 may through other components, provide other information that may be employed to determine a physical location of the device, including, for example, a Media Access Control (MAC) address, IP address, or the like.

Mass memory 226 includes a Random Access Memory (RAM) 204, a Read-Only Memory (ROM) 222, and other storage means. Mass memory 226 illustrates an example of computer readable storage media (devices) for storage of information such as computer readable instructions, data structures, program modules or other data. Mass memory 226 stores a basic input/output system ("BIOS") 224 for controlling low-level operation of client device 200. The mass memory also stores an operating system 206 for controlling the operation of client device 200. It will be appreciated that this component may include a general-purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Mass memory 226 further includes one or more data storage 208, which can be utilized by client device 200 to store, among other things, applications 214 and/or other data. For example, data storage 208 may also be employed to store information that describes various capabilities of client device 200. The information may then be provided to another device based on any of a variety of events, including being sent as part of a header during a communication, sent upon request, or the like. Data storage 208 may also be employed to store social networking information including address books, buddy lists, aliases, user profile information, or the like. Data stores 208 may further include program code, data, algorithms, and the like, for use by a processor, such as CPU 202 to execute and perform actions. In one embodiment, at least some of data store 208 might also be stored on another component of network device 200, including, but not limited to processor readable storage device 230, disk drive or an other computer-readable storage device (not shown) within client device 200, or even external to client device 200.

Applications 214 may include computer executable instructions which, when executed by client device 200, transmit, receive, and/or otherwise process messages (e.g., SMS, Multimedia Message Service (MMS), Instant Message (IM), email, and/or other messages), audio, video, and enable telecommunication with another user of another client device. Other examples of application programs include calendars, search programs, email clients, IM applications, SMS applications, Voice Over Internet Protocol (VOIP) applications, contact managers, task managers, transcoders, database programs, word processing programs, security applications, spreadsheet programs, games, search programs, and so forth. Applications 214 may include, for example, messenger 216, and browser 218.

Browser 218 may include virtually any application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), and the like, to display and send a message. However, any of a variety of other web-based languages may be employed. In one embodiment, browser 218 may enable a user of client device 200 to provide and/or receive content including messages and/or other documents between another computing device for posting, reading, and/or otherwise communicating with another client device.

Messenger 216 may be configured to manage a messaging session using any of a variety of messaging communications including, but not limited to email, SMS, IM, MMS, Internet relay chat (IRC), Microsoft IRC (mIRC), Really Simple Syndication (RSS) feeds, and/or the like. For example, in one embodiment, messenger 216 may be configured as an IM application, such as AOL (America Online) Instant Messenger, Yahoo! Messenger, .NET Messenger Server, ICQ ("I seek you"), or the like. In one embodiment, messenger 216 may be configured to include a mail user agent (MUA) such as Elm, Pine, Message Handling (MH), Outlook, Eudora, Mac Mail, Mozilla Thunderbird, or the like. In another embodiment, messenger 216 may be a client application that is configured to integrate and employ a variety of messaging protocols, including, but not limited to various push and/or pull mechanisms for client device 200. In one embodiment, messenger 216 may interact with browser 218 for managing messages. As used herein, the term "message" refers to any of a variety of messaging formats, or communications forms, including but not limited to email, SMS, IM, MMS, IRC, or the like.

Illustrative Network Device

Figure 3:
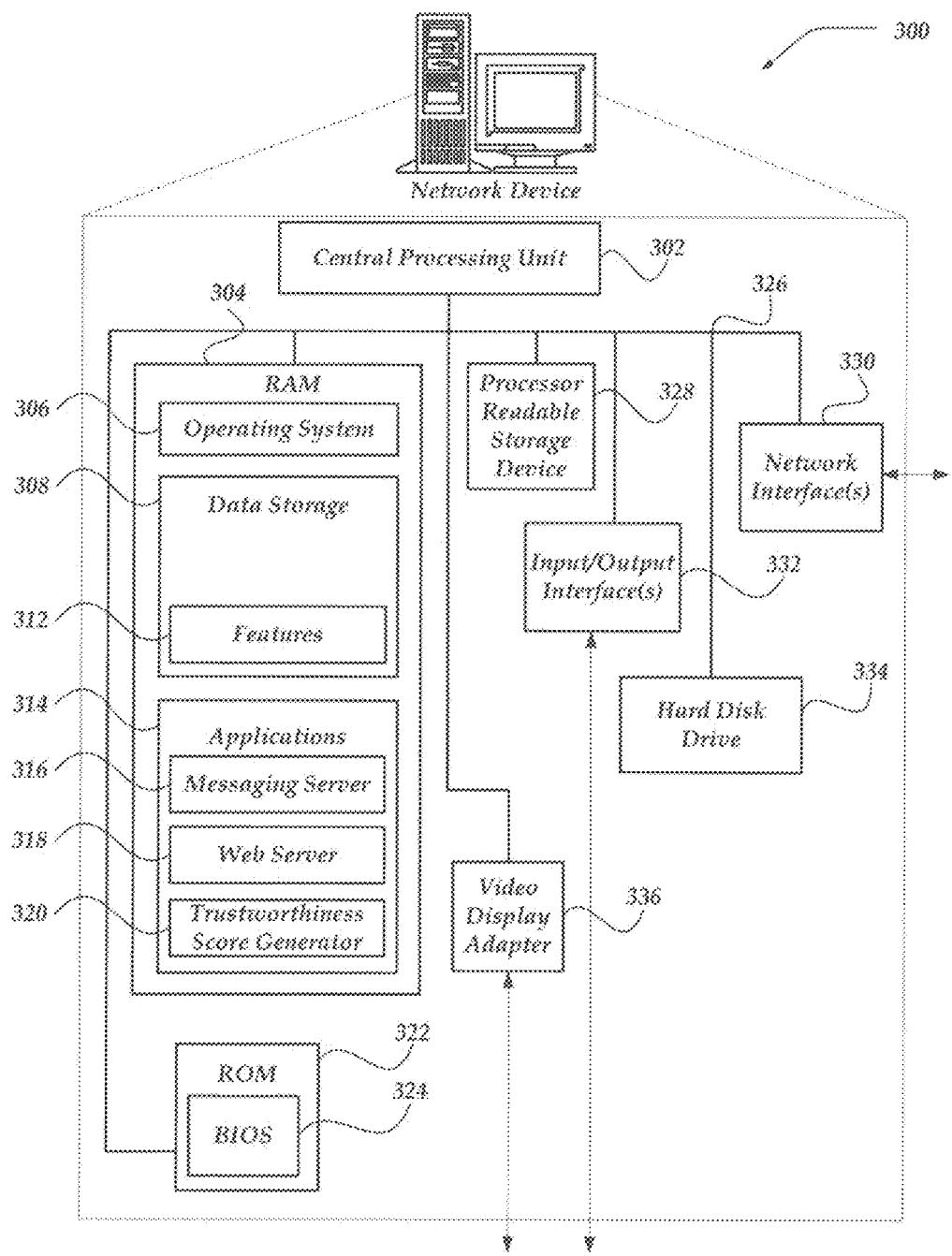
FIG. 3 shows an embodiment of a network device that may be included in a system such as that shown in FIG. 1.

FIG. 3 shows one embodiment of a network device 300, according to one embodiment. Network device 300 may include many more or less components than those shown. The components shown, however, are sufficient to disclose an illustrative embodiment for practicing the invention. Network device 300 may be configured to operate as a server, client, peer, or any other device. Network device 300 may represent, for example, TSGD 108 of FIG. 1.

Network device 300 includes processing unit 302, an input/output interface 332, video display adapter 336, and a mass memory, all in communication with each other via bus 326. The mass memory generally includes RAM 304, ROM 322 and one or more permanent mass storage devices, such as hard disk drive 334, tape drive, optical drive, and/or floppy disk drive. The mass memory stores operating system 306 for controlling the operation of network device 300. Any general-purpose operating system may be employed. Basic input/output system ("BIOS") 324 is also provided for controlling the low-level operation of network device 300. As illustrated in FIG. 3, network device 300 also can communicate with the Internet, or some other communications network, via network interface unit 330, which is constructed for use with various communication protocols including the TCP/IP protocol. Network interface unit 330 is sometimes known as a transceiver, transceiving device, or network interface card (NIC).

Network device 300 also comprises input/output interface 332 for communicating with external devices, such as a keyboard, or other input or output devices not shown in FIG. 3. Input/output interface 332 can utilize one or more communication technologies, such as USB, infrared, Bluetooth™, or the like.

The mass memory as described above illustrates another type of computer-readable media, namely computer-readable storage media and/or processor-readable storage medium. Computer-readable storage media (devices) may include volatile, nonvolatile, removable, and non-removable media implemented in any method or technology for storage of information, such as computer readable instructions, data structures, program modules, or other data. Examples of computer readable storage media include RAM, ROM, Electrically Erasable Programmable Read-Only Memory (EEPROM), flash memory or other memory technology, Compact Disc Read-Only Memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computing device.

As shown, data storage 308 may include a database, text, spreadsheet, folder, file, or the like, that may be configured to maintain and store user account identifiers, user profiles, email addresses, IM addresses, and/or other network addresses; or the like. Data stores 308 may further include program code, data, algorithms, and the like, for use by a processor, such as central processing unit (CPU) 302 to execute and perform actions. In one embodiment, at least some of data store 308 might also be stored on another component of network device 300, including, but not limited to processor readable storage medium 328, hard disk drive 334, or the like. Data storage 308 may further store features 312. Features 312 may include dynamic behavioral features and/or static profile features about each user account. In some embodiments, features 312 may be obtained from a client device, such as client device 200 of FIG. 2.

The mass memory also stores program code and data. One or more applications 314 are loaded into mass memory and run on operating system 306. Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. Messaging server 316, web server 318, and trustworthiness score generator 320, may also be included as application programs within applications 314.

Messaging server 316 may include virtually any computing component or components configured and arranged to forward messages from message user agents, and/or other message servers, or to deliver messages to a local message store, such as data storage 308, or the like. Thus, messaging server 316 may include a message transfer manager to communicate a message employing any of a variety of email protocols, including, but not limited to, Simple Mail Transfer Protocol (SMTP), Post Office Protocol (POP), Internet Message Access Protocol (IMAP), Network New Transfer Protocol (NNTP), or the like. Messaging server 316 may also be managed by one or more components of messaging server 316. Thus, messaging server 316 may also be configured to manage SMS messages, 1M, MMS, IRC, RSS feeds, mIRC, or any of a variety of other message types. In one embodiment, messaging server 316 may enable users to initiate and/or otherwise conduct chat sessions, VOIP sessions, or the like.

In one embodiment, messaging server 316 may receive media content from another network device, such as a client device, or the like. Messaging server 316 may then enable the network device to share media content with another network device. Messaging server 316 may provide the media content, a media content platform for interacting with the media content, or the like.

Web server 318 represent any of a variety of services that are configured to provide content, including messages, over a network to another computing device. Thus, web server 318 includes, for example, a web server, a File Transfer Protocol (FTP) server, a database server, a content server, or the like. Web server 318 may provide the content including messages over the network using any of a variety of formats including, but not limited to WAP, HDML, WML, SGML, HTML, XML, compact HTML (cHTML), extensible HTML (xHTML), or the like.

Trustworthiness score generator 320 may be configured to employ a process to generate user account trustworthiness scores for a given action, identify a trusted group for the given action, classify an item based on inputs from the trusted group, and dynamically evolve the trusted group by modifying the trustworthiness scores. Trustworthiness score generator 320 may, in one embodiment, employ a classifier to generate user account trustworthiness scores for a given action. Trustworthiness score generator 320 may be configured to employ the user account trustworthiness scores to identify a trusted group of user accounts. Moreover, trustworthiness score generator 320 may utilize input (e.g. through a user's use of client device 200 of FIG. 2) from a plurality of user accounts, such as the trusted group, to classify an item. In one embodiment, trustworthiness score generator 320 may be configured to utilize user account trustworthiness scores to determine if a user account is a bot account or a human account.

In some embodiments, trustworthiness score generator 320 may modify a trustworthiness score of each user account based on a comparison of input from a corresponding user account to input from other user accounts. In some embodiments, trustworthiness score generator 320 may dynamically evolve the trusted group for a given action by regrouping the user accounts based on modified trustworthiness scores for the given action. In any event, trustworthiness score generator 320 may perform actions such as those described below in conjunction with FIGS. 4-7.

General Operation

Figure 4:
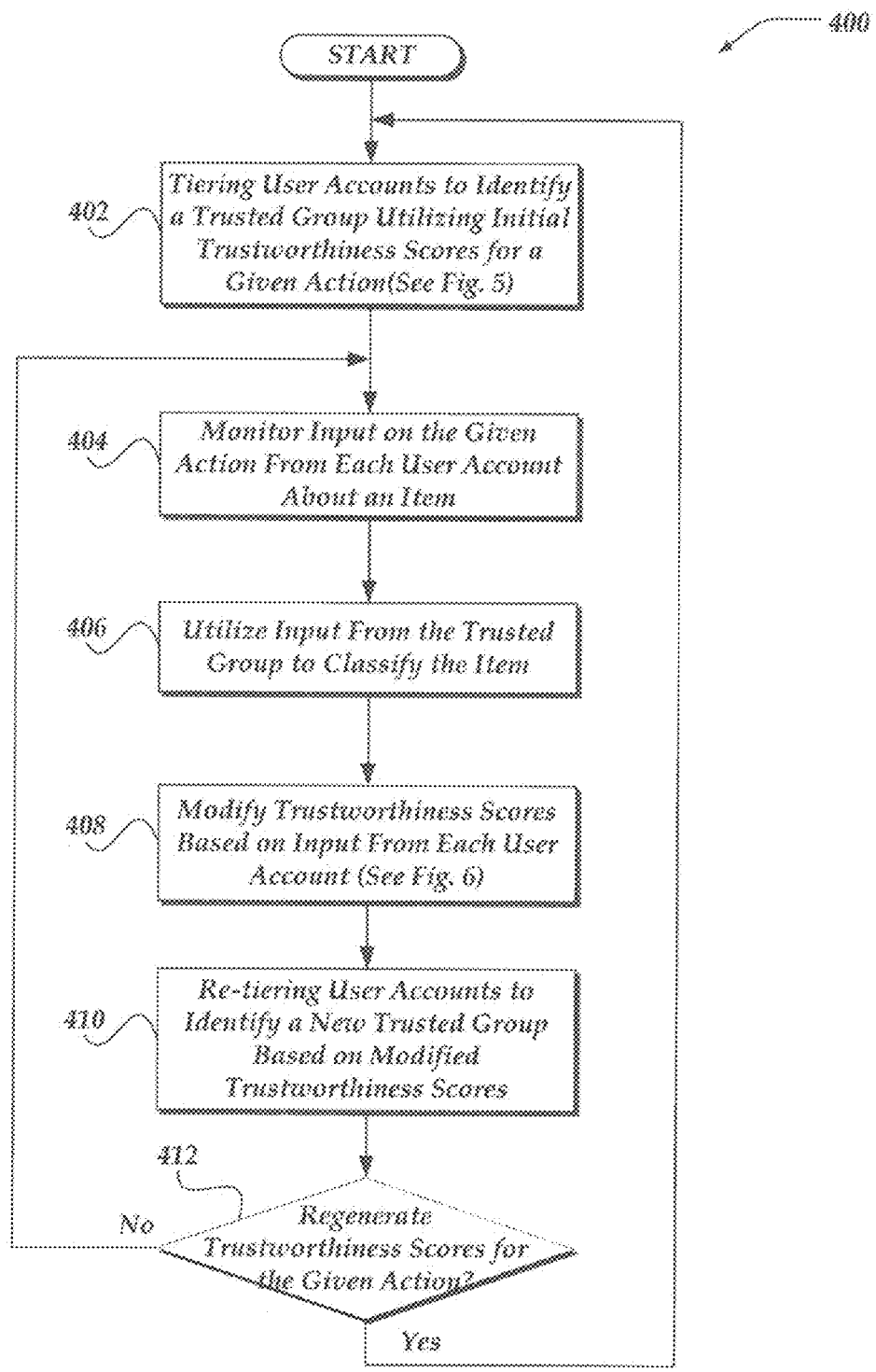
FIG. 4 illustrates a logical flow diagram generally showing one embodiment of an overview process for identifying and dynamically evolving a trusted group of user accounts using trustworthiness scores.

The operation of certain aspects of an embodiment will now be described with respect to FIGS. 4-6. FIG. 4 illustrates a logical flow diagram generally showing one embodiment of an overview process for identifying and dynamically evolving a trusted group of user accounts using trustworthiness score for each of a plurality of user accounts for a given action. In some embodiments, process 400 can be implemented for a plurality of actions. Thus, in one embodiment, each user account may have a plurality of trustworthiness scores, each associated with a different action. In some embodiments, process 400 of FIG. 4 may be implemented by and/or executed on a single network device, such as network device 300 of FIG. 3. In other embodiments, process 400 or portions of process 400 of FIG. 4 may be implemented by and/or executed on a plurality of network devices, such as network device 300 of FIG. 3.

Process 400 begins, after a start block, at block 402, which is described in more detail below in conjunction with FIG. 5. Briefly, however, at block 402, a trusted group of user accounts is identified by generating and tiering trustworthiness scores for a given action. Process 400 then proceeds to block 404, where inputs for the given action about an item are monitored from a plurality of user accounts. The input may vary depending on the given action and the item. In one non-limiting and non-exhaustive example, if the item is a message and the given action is providing feedback, then the input may be a vote that the message is spam or non-spam. In another non-limiting example, the input may be a rating of content. However, it should be understood that various embodiments are not so limited and other inputs may be monitored.

Continuing next to block 406, input from the identified trusted group for the given action is utilized to classify the item. In one embodiment, inputs may be monitored for a predetermined period of time. In another embodiment, inputs may be monitored until a predefined number of inputs is received. In other embodiments, inputs about a specific item and/or similar items may be monitored. An item may be similar to another item based on an originator and/or sender of the item, a predefined amount of like content, or the like.

In some embodiments, an item may be classified based on similar input from a threshold number of user accounts in the trusted group. Similar input may refer to two or more inputs or content of two or more inputs that are within an engineering statistical variation of each other. For example, two user accounts may provide similar input if one user account rates an image a 4.8 and the other user account rates the image a 4.9. Further, the threshold number of user accounts may be any suitable threshold value, such as, for example, a simple majority (e.g. greater than 50%), a super majority (e.g. two-thirds), or the like.

In alternative embodiments, an item may be classified based on input from user accounts from more than one tier. In one embodiment, an item may be classified based on similar input from a threshold number of all user accounts that provide input. In other embodiments, an item may be classified based on a weighted input from each user account. In one embodiment, the weighted input of each user account may be based on a corresponding trustworthiness score assigned to each user account. In another embodiment, the weighted input of each user account may be based a weight associated with a corresponding tier of each user account.

Processing then flows to block 408, which is described in more detail below in conjunction with FIG. 6. Briefly, however, at block 408, trustworthiness scores for the given action are modified based on a comparison of input from each user account for the given action and input from other user accounts for the given action.

Process 400 next proceeds to block 410, where a new trusted group may be identified by re-tiering the user accounts into groups based on the modified trustworthiness scores. In some embodiments, one or more user accounts can move in and/or out of any tier, including the trusted group, depending on the modified trustworthiness scores of the one or more user accounts and the modified trustworthiness scores of other user accounts. In some embodiments, a number and size of the tiers may remain the same, as determined at block 506 of FIG. 5. In other embodiments, the number and size of the tiers may change over time to accommodate the modified trustworthiness scores. For example, assume the trusted group is determined by all user accounts with a trustworthiness score above 0.8 (in a range of zero to one) and the trusted group initially includes 75% of the user accounts. Now assume that the trustworthiness scores are modified over some period of time, and over 99% of the user accounts have a trustworthiness score above 0.8. Therefore, it may be desirable to modify the trusted group threshold value, such as, for example to 0.9, to modify a size of the trusted group.

In any event, processing then flows to decision block 412, where a determination is made whether to regenerate each user account trustworthiness score for the given action. In one embodiment, trustworthiness scores may be regenerated periodically, randomly, and/or at a predetermined time. In yet other embodiments, an evaluation as to an accuracy of the trusted group may be utilized to determine whether or not to regenerate the trustworthiness scores for a given action, such as is described at block 510 of FIG. 5. In one non-limiting and non-exhaustive example, an evaluation may indicate that for a sample set of messages, the trusted group voted incorrectly a majority of the time. Thus, the trustworthiness scores may be regenerated to identify a new trusted group.

In some embodiments, trustworthiness scores may be regenerated if new, additional, and/or different features are determined that may further indicate a user account's trustworthiness. In some situations, as trustworthiness scores are modified over time, the trustworthiness scores for the given action may become clustered and it may be desirable to redistribute the trustworthiness scores, which may be accomplished by regenerating the trustworthiness scores for the given action. If a determination is made to regenerate the trustworthiness scores for a given action, then processing loops to block 402; otherwise, processing loops to block 404 to monitor input about an other item for the given action.

As described above, multiple instances of process 400 may be separately implemented for each of a plurality of different actions.

Figure 5:
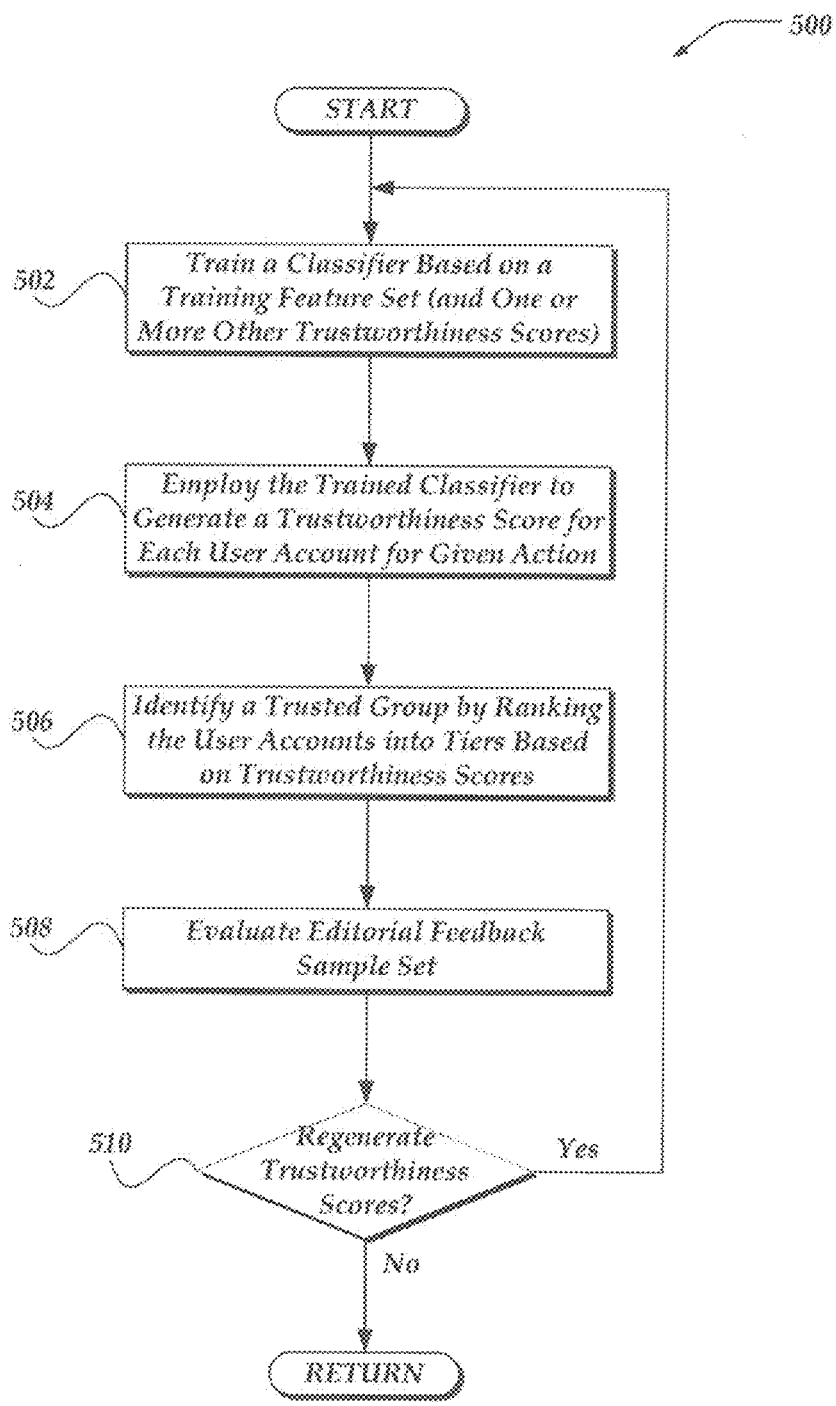
FIG. 5 illustrates a logical flow diagram generally showing one embodiment of a process for identifying an initial trusted group of user accounts by generating and tiering user account trustworthiness scores.

FIG. 5 illustrates a logical flow diagram generally showing one embodiment of a process for generating initial user trustworthiness scores and identifying a trusted group of user accounts for a given action. Process 500 begins, after a start block, at block 502, where a classifier is trained for the given action based on a training feature set. The classifier can be any suitable type of machine learning algorithm, including, but not limited to, decision trees, linear regressors, support vector machines, or the like. In one embodiment, the classifier may be trained to generate initial trustworthiness scores between zero and one by using a weighted combination of features from the training feature set. Thus, a user account with a trustworthiness score of one for the given action may be 100% trusted for that action. However, embodiments are not so limited and other reasonable trustworthiness score ranges may be employed.

In some embodiments, the training feature set can be collected from a training set of user accounts that are known to be trusted user accounts, untrusted user accounts, or any combination thereof. The features used to train the classifier may include dynamic behavioral features and/or static profile information. In other embodiments, the training feature set for a classifier for a given action may also include a trustworthiness score for a different action. Thus, a trustworthiness score for a given action may be dependent on a trustworthiness score for a different action. Additionally, a different classifier may be trained for different actions, such as, in one embodiment, by utilizing a different training feature set. Although, the initial trustworthiness scores are generated by employing a classifier, embodiments are not so limited and other methods of generating initial trustworthiness scores may be employed, such as, for example each user account may be assigned a random initial trustworthiness score.

Processing continues to block 504, where the trained classifier for the given action is employed to generate a trustworthiness score for each of a plurality of user accounts for the given action. A trustworthiness score for each user account may be generated based on a feature set obtained from a corresponding user account. The feature set obtained for each of the plurality of user accounts may include the same features as included the training feature set used to train the classifier.

In some embodiments, the trustworthiness score of a user account may be stored in a profile of the user account. In other embodiments, a database may store and map trustworthiness scores to user accounts for a given action. However, embodiments are not so limited and other methods for storing the trustworthiness scores may be.

Continuing next to block 506, a trusted group of user accounts for the given action is identified by tiering the user accounts into groups based on the generated trustworthiness scores. It is envisioned that any suitable number and size of tiers may be determined. The tiers may be based on predefined trustworthiness score threshold values, predefined percentage threshold values, or the like. In one non-limiting and non-exhaustive example, the user accounts may be grouped into three tiers, a trusted group tier, a mid-tier group, and an untrusted group tier. The trusted group tier may include those user accounts with trustworthiness scores in the top 10% of all user account trustworthiness scores. The untrusted group tier may include those user accounts with trustworthiness scores in the bottom 10% of all user account trustworthiness scores. And the mid-tier group may include the remaining user accounts. However, other numbers of tiers and/or threshold values may be implemented.

Process 500 next proceeds to block 508, where an editorial feedback sample set is evaluated. The editorial feedback sample set may be utilized to determine an accuracy of a classifier for generating trustworthinessscores for a given action. The editorial feedback sample set may include a sample set of inputs from a subset of user accounts for a given action about a sample item. The inputs from the subset of user accounts can be compared to a known input about the sample item to determine the truthfulness of each of the subset of user accounts. The truthfulness of each of the subset of user accounts can then be compared to a corresponding user account trustworthiness score, which may result in an indication of how accurate the trained classifier performed at generating the trustworthiness scores for the given action. In some embodiments, accuracy of the trained classifier may be based on a precision and recall of the editorial feedback sample set. In one embodiment, the precision may determine a percentage of user accounts that are good user accounts that have a trustworthiness score above a threshold value, where a good user account provides accurate input. In another embodiment, the recall may determine a percentage of the good user accounts that have a trustworthiness score above a threshold value. In some embodiments, evaluating the editorial feedback sample set may also provide an indication of additional features that can be used to train the classifier.

Processing then flows to decision block 510, where a determination is made whether to regenerate the user account trustworthiness scores for the given action. In some embodiments, trustworthiness scores may be regenerated based on the evaluation of the editorial feedback sample set. In one embodiment, if the classifier is determined (at block 508) to be inaccurate, then the trustworthiness scores may be regenerated. In another embodiment, the trustworthiness scores may be regenerated if the evaluation of the editorial feedback sample set indicates that a different feature may be used to train the classifier for the given action. If a determination is made to regenerate trustworthiness scores, then processing loops to block 502; otherwise, processing returns to a calling process to perform other actions.

Figure 6:
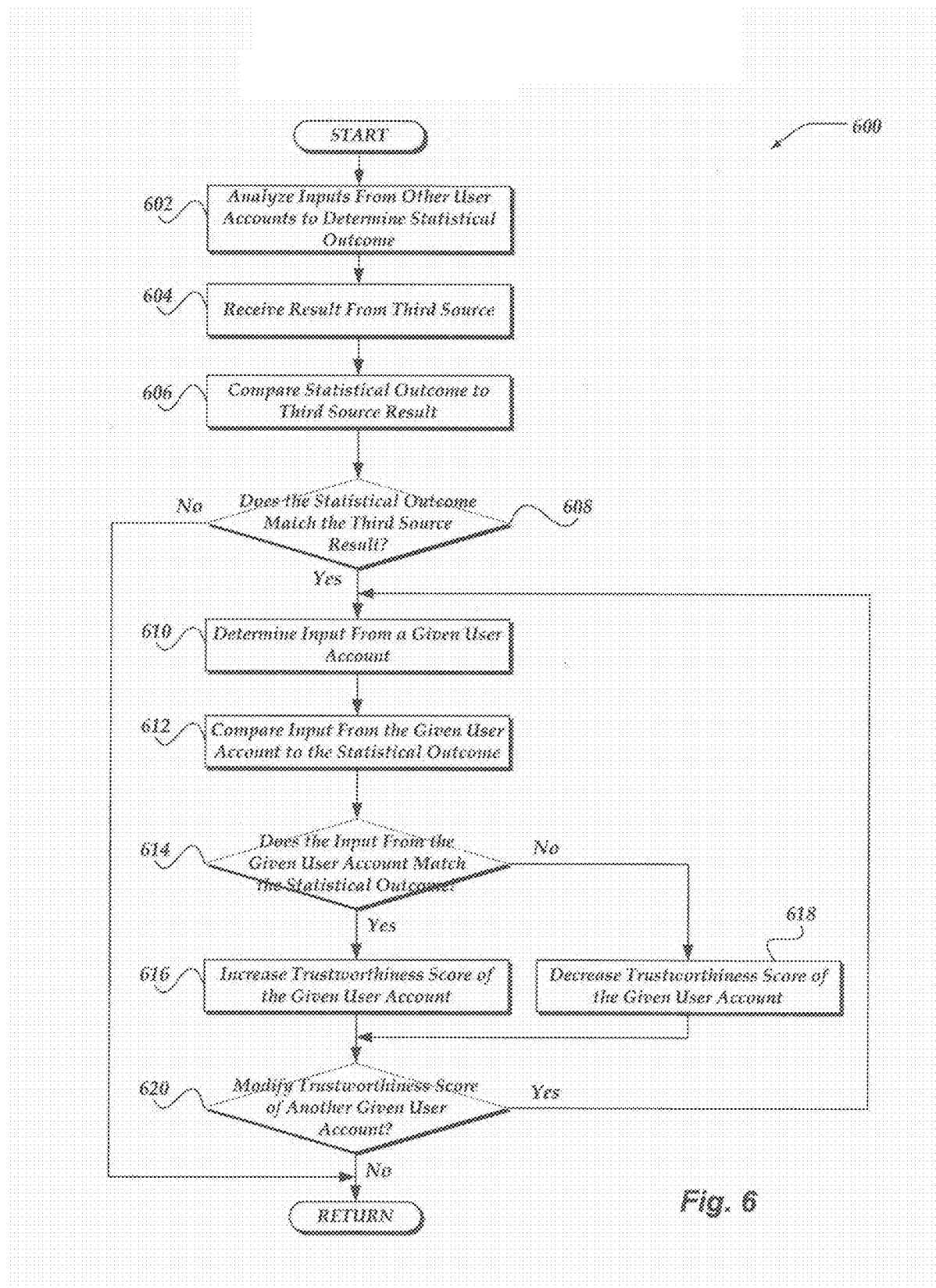
FIG. 6 illustrates a logical flow diagram generally showing one embodiment of a process for modifying trustworthiness scores.

FIG. 6 illustrates a logical flow diagram generally showing one embodiment of a process for modifying trustworthiness scores for a given action. Process 600 begins, after a start block, at block 602, where inputs from other user accounts are analyzed to determine a statistical outcome of the inputs from the other user accounts. The statistical outcome may then be used for comparison, as described below at block 606 and block 612. In some embodiments, the other user accounts may include all user accounts or a subset of all user accounts that provide input, such as the monitored inputs at block 404 of FIG. 4. In one embodiment, the other user accounts may include all the user accounts in a trusted group for the given action that provided input. In another embodiment, the other user accounts may include user accounts from a plurality of tiers that provided input.

In some embodiments, the statistical outcome may be determined based on a threshold value of the other user accounts (e.g. a simple majority) that provided similar input. Similar input may refer to two or more inputs or content of two or more inputs that are within an engineering statistical variation of each other. In other embodiments, the statistical outcome may be determined based on a weighted input of each of the other user accounts. In one embodiment, the weighted input of each of the other user accounts may be based on a corresponding trustworthiness score. In another embodiment, the weighted input of each of the other user accounts may be based a weight associated with a corresponding tier of each of the other user accounts. In one non-limiting and non-exhaustive example, assume that the other user accounts include the trusted group of user accounts that voted on a message as spam or non-spam. Next assume that a majority of the voting trusted group voted that the message is spam. Therefore, the statistical outcome of the votes from the other user accounts may be that the message is spam. However, embodiments are not so limited and other variations in determining the other user accounts and the statistical outcome may be employed, such that the statistical outcome can be used as a comparison to a third source result and to an input from a given user, as described below.

Process 600 continues to block 604, where a result from a third source is received. In some embodiments, the third source may be a spam filter, scoring committee, or the like. Thus, in one non-limiting and non-exhaustive example, the results from a third source may be a label from a spam filter that a message is a spam message.

Processing then flows to block 606, where a comparison is made between the statistical outcome of the inputs from the other user accounts and the third source results. Process 600 then proceeds to decision block 608, where a determination is made whether the statistical outcome matches the third source result. A match may be determined if the statistical outcome and the third source result are within an engineering statistical variation of each other. If the statistical outcome matches the third source result, then processing flows to block 610; otherwise, processing returns to a calling process to perform other actions.

In an alternative embodiment, if the statistical outcome does not match the third source result, then the statistical outcome or the third source result may be selected for comparison at block 612. In one embodiment, the selection may be determined based on a statistical variance level between a trust level of the statistical outcome and a trust level of the third source result, such that, in one embodiment, the third source result may be selected if it is determined to have a higher trust level than the trust level for the statistical outcome and, in another embodiment, the statistical outcome may be selected if it is determined to have a higher trust level than the trust level of the third source result.

At block 610, input from a given user account is determined. In one embodiment, the input from the given user account may be determined from the monitored inputs at block 404 of FIG. 4. Processing then flows to block 612, where a comparison is made between the input from the given user and the statistical outcome of the inputs from the other user accounts, as determined at block 602. Processing then continuing at decision block 614, where a determination is made whether the input from the given user account matches the statistical outcome. A match may be determined if the input from the given user account and the statistical outcome are within an engineering statistical variation of each other. If the input from the user account matches the input from the other user accounts, then processing flows to block 616; otherwise, processing flows to block 618.

At block 616, a trustworthiness score of the given user account for the given action is increased. In one embodiment, the trustworthiness score may be increased by some percentage. In one non-limiting, non-exhaustive example, the percentage may be selected to be between about 105%-120% of a previous trustworthiness score. In other embodiments, the trustworthiness score may be increased by a constant value, such as 0.05 or 0.1, or some other constant. However, other values may also be selected.

In some embodiments, an amount to increase the trustworthiness score for the given action of the given user account may be dependent on a number of times that the given user account provides input for the given action. In one embodiment, as the number of times that the given user account provides input increases, the amount to increase the trustworthiness score of the given account may either increase or decrease from a previous increase in the trustworthiness score of the given user account. Thus, the more times a user account provides input, the more or less the trustworthiness score for the user account may change.

In other embodiments, an amount to increase the trustworthiness score for a given action of the given user account may depend on a current trustworthiness score and/or on a tier that the user account is in. In one embodiment, the trustworthiness score of a user account in an untrusted group may increase less than a trustworthiness score of a user account in a mid-tier group. Although certain embodiments are described for increasing the trustworthiness score of a given user account, embodiments are not so limited; rather, any suitable algorithm to increase the trustworthiness score may be employed.

Moreover, in some embodiments, the trustworthiness score may be limited to a maximum trustworthiness score. In one embodiment, the maximum trustworthiness score may be limited based on the classifier associated with the given action, such as, for example, a maximum trustworthiness score that can be generated by a trained classifier for the given action. In another embodiment, the maximum trustworthiness score may be a predetermined arbitrary value. Processing then flows to decision block 620.

At block 618, a trustworthiness score of the given user account is decreased. In one embodiment, the trustworthiness score may be decreased by some percentage. In one non-limiting, non-exhaustive example, the percentage may be selected to be between about 94%-98% of a previous trustworthiness score. In other embodiments, the trustworthiness score may be decreased by a constant value, such as 0.05 or 0.1, or some other constant. However, other values may also be selected.

In some embodiments, an amount to decrease the trustworthiness score for a given action of a given user account may be dependent on a number of times that the given user account provides input for the given action. In one embodiment, as the number of times that the user provides input increases, the amount to decrease the trustworthiness score may either increase or decrease from a previous decrease in the trustworthiness score.

In other embodiments, an amount to decrease the trustworthiness score for a given action of a user account may depend on the trustworthiness score value and/or on a tier that the user account is in. In one embodiment, the trustworthiness score of a user account in a trusted group may decrease less than a trustworthiness score of a user account in a mid-tier group. Although certain embodiments are described for decreasing the trustworthiness score, embodiments are not so limited; rather, any suitable algorithm to decrease the trustworthiness score may be employed.

Moreover, in some embodiments, the trustworthiness score may be limited to a minimum trustworthiness score. In one embodiment, the minimum trustworthiness score may be limited based on the classifier associated with the given action, such as, for example a minimum trustworthiness score that can be generated by a trained classifier for the given action. In another embodiment, the minimum trustworthiness score may be a predetermined arbitrary value. Processing then flows to decision block 620.

At decision block 620, a determination is made whether to modify a trustworthiness score of another given user account. In one embodiment, a trustworthiness score of each user account that provides input, such as the monitored inputs at block 404 of FIG. 4, may be modified. In another embodiment, a trustworthiness score of all user accounts may be modified. If a trustworthiness score of another given user account is to be modified, then processing loops to block 610; otherwise, processing returns to a calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions.

Use Case Illustrations and Alternative Embodiments

Figure 7:
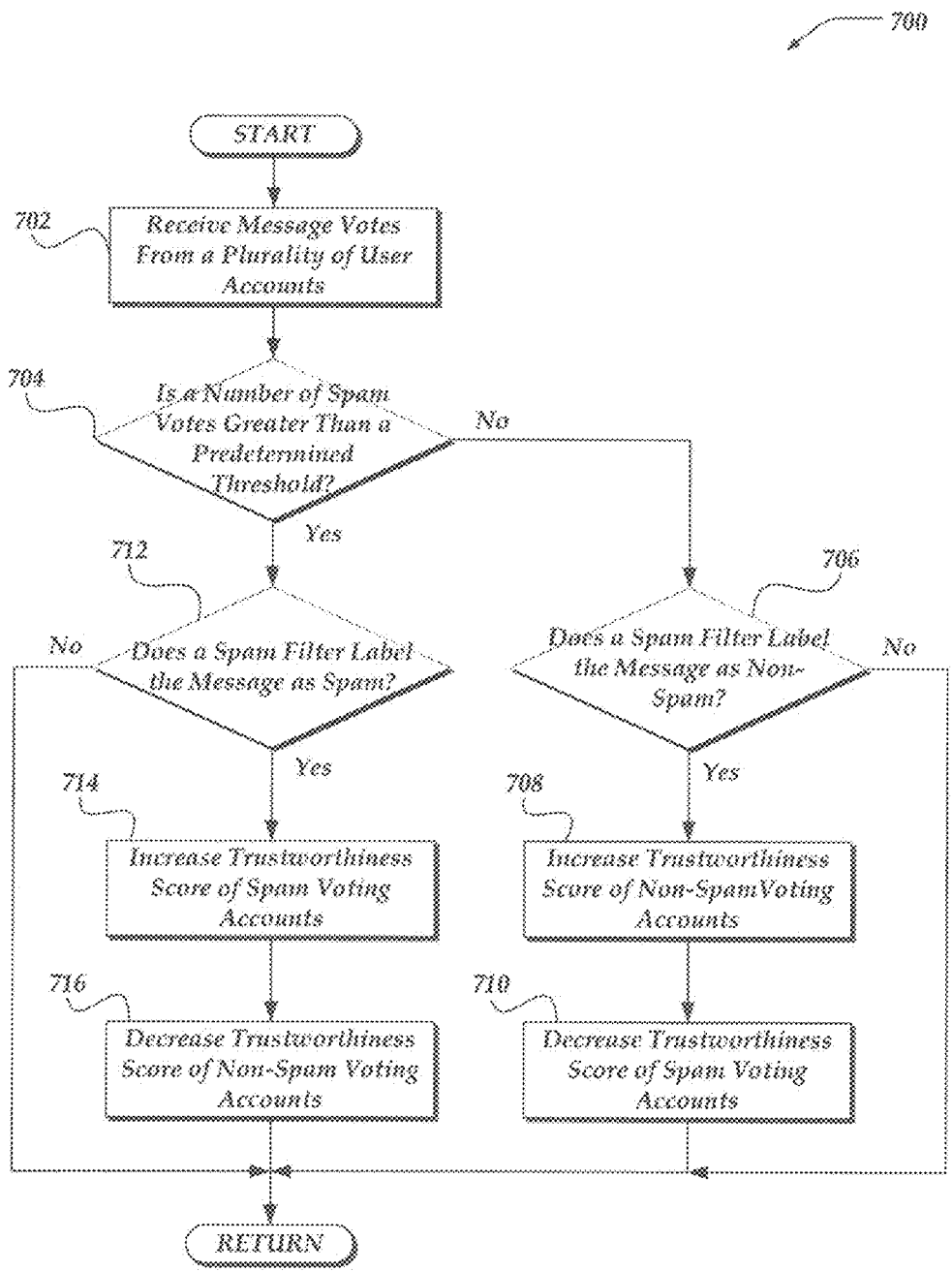
FIG. 7 illustrates a logical flow diagram generally showing one embodiment of a use case process for modifying user account trustworthiness scores based on user account input.

FIG. 7 illustrates a logical flow diagram generally showing one embodiment of a use case process for modifying trustworthiness scores based on user account input. In one embodment, the process described by FIG. 7 may be called from block 408 of FIG. 4. However, embodiments are not so limited and, as described above, other methods of modifying trustworthiness scores for a given action may be employed.

Prior to process 700 a plurality of user accounts may be tiered into a trusted group tier, a mid-tier group, and an untrusted group tier, such as is described at block 508 of FIG. 5. Process 700 begins, after a start block, at block 702, where message votes are received from a plurality of user accounts. The message votes can be spam or non-spam (ham) votes for a particular message or messages with similar content. In some embodiments, the particular message may be from a single sender or from a plurality of senders. The user accounts can provide a message vote by clicking on a button, link, or the like to indicate whether the message is spam or non-spam. Once the votes are received, the votes may be classified as spam votes from the trusted group (ST), ham votes from the trusted group (HT), spam votes from the mid-tier group (SM), ham votes from the mid-tier group (HM), spam votes from the untrusted group (SU), or ham votes from the untrusted group (HU).

Process 700 then proceeds to decision block 704, where a determination is made whether a number of spam votes is greater than a predetermined threshold. The predetermined threshold may be a predetermined percentage of votes, such as a simple majority (such as greater than 50%), a super majority (such as two-thirds), or other suitable percentage. If a determination is made that the number of spam votes is greater than the predetermined threshold, then processing flows to decision block 712; otherwise, processing flows to decision block 706.

At decision block 706, a determination is made whether a spam filter-labeled the message as non-spam. In some embodiments, a spam filter may label the message as non-spam based on a sender of the message, the contents of the message, or the like. If the spam filter labeled the message as non-spam then processing flows to block 708; otherwise, processing returns to a calling process to perform other actions.

At block 708, a trustworthiness score of each user account that provided a non-spam vote (e.g. user accounts in HM and HU) is increased by some value based on a certain rule, such as, for example, by a predefined percentage increase. Increasing a trustworthiness score of each non-spam voting user account may be similar to that which is described at block 610 of FIG. 6 for increasing a trustworthiness score for a given user account.

Process 700 then proceeds to block 710, where a trustworthiness score of each user account that provided a spam vote (e.g. user accounts in SM and SU) is decreased by some value based on a certain rule, such as, for example, by a predefined percentage decrease. Decreasing a trustworthiness score of each spam voting user account may be similar to that which is described at block 612 of FIG. 6 for decreasing a trustworthiness score for a given user account. After block 710, process 700 returns to a calling process to perform other actions.

Continuing at decision block 712, a determination is made whether a spam filter labeled the message as spam. In some embodiments, a spam filter may label the message as spam based on a sender of the message, the contents of the message, or the like. If the spam filter labeled the message as spam, then processing flows to block 714; otherwise, processing returns to a calling process to perform other actions.

At block 714, a trustworthiness score of to each user account that provided a spam vote (e.g. user accounts in SM and SU) is increased by some value based on a certain rule, such as, for example, by a predefined percentage increase. Increasing a trustworthiness score for each spam voting user account may be similar to that which is described at block 610 of FIG. 6 for increasing a trustworthiness score for a given user account.

Process 700 then proceeds to block 716, where a trustworthiness score assigned to each user account that provided a non-spam vote (e.g. user accounts in HM and HU) is decreased by some value based on a certain rule, such as, for example, by a predefined percentage decrease. Decreasing a trustworthiness score for each non-spam voting user account may be similar to that which is described at block 612 of FIG. 6 for decreasing a trustworthiness score for a given user account. After block 716, process 700 returns to a calling process to perform other actions.

In an alternative embodiment, each tier for a given action (as determined at block 506 of FIG. 5) may be assigned one or more sub-actions and/or privileges. Therefore, a user account may be able to perform specific sub-actions based on a corresponding tier associated with a trustworthiness score of the user account. In one embodiment, the trustworthiness score may identify an account as a human account or a robot account. In other embodiments, input from user accounts in one or more tiers may be utilized differently than input from user accounts in another tier. In one embodiment, input from user accounts in one or more tiers may be utilized to modify a spam filter, or other anti-spam system. Modifying a spam filter may include adding a message that is identified as spam by the input from the user accounts in the one or more tiers to a spam listing, training a spam filter classifier to identify a message as spam based on the input from the user accounts in the one or more tiers, Or the like.

Figure 8:
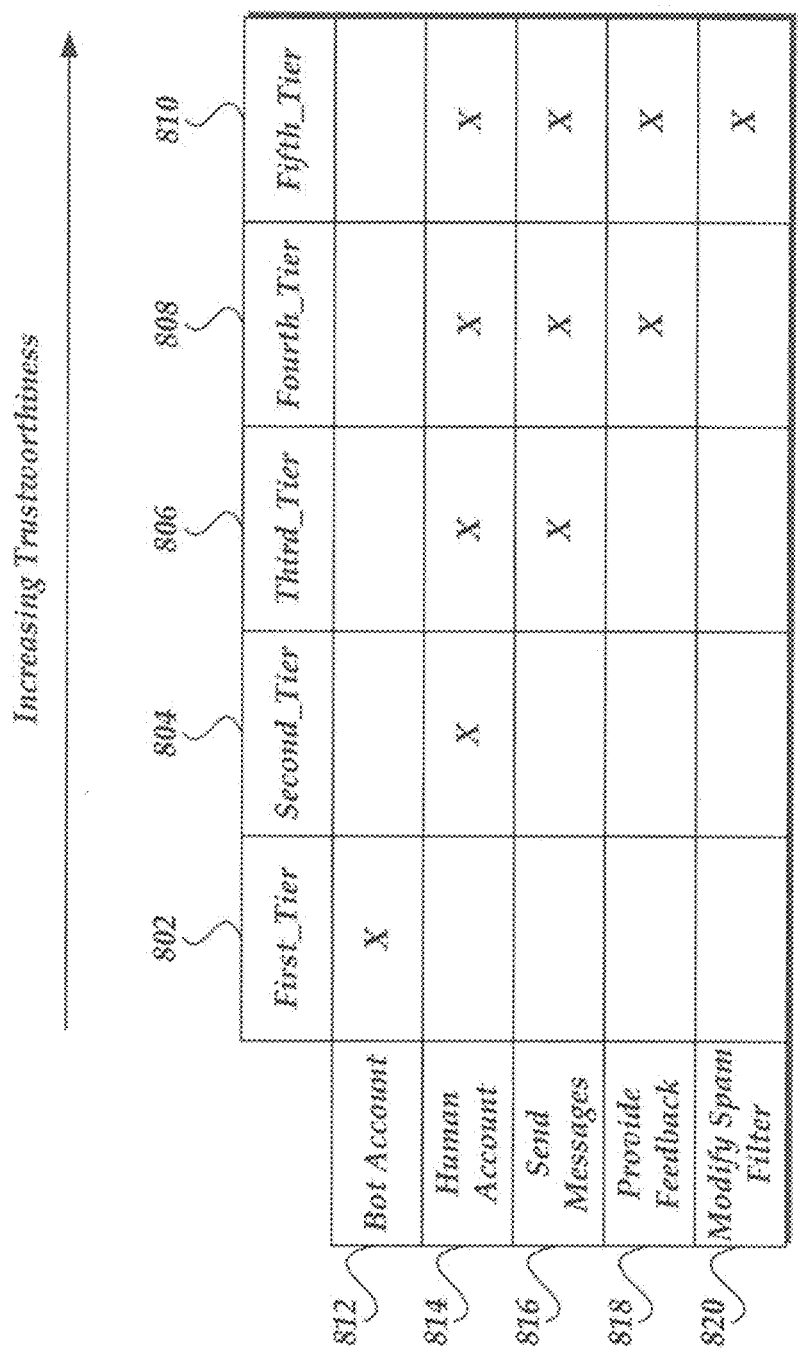
FIG. 8 shows a non-exhaustive example of a table of a use case of an embodiment for employing user account trustworthiness scores.

One non-limiting, non-exhaustive example is illustrated in FIG. 8. FIG. 8 shows a table of a use case of an alternative embodiment for employed user account trustworthiness scores. Assume that a plurality of user accounts are tiered into five tiers based on user account trustworthiness scores (such as is described at block 506 of FIG. 5), such as a First_Tier (802), Second_Tier (804), Third_Tier (806), Fourth_Tier (808), and Fifth_Tier (810), where the First_Tier (802) includes the user accounts that are determined to be the least trustworthy (e.g. trustworthiness scores less than 0.1 on a scale of 0-1) and the Fifth_Tier (810) includes the user accounts that are determined to be the most trustworthy (e.g. trustworthiness scores greater than 0.8 on a scale of 0-1).

Each tier may be associated with a different set of sub-actions and/or privileges. Similarly, input from each tier may be utilized differently. For example, user accounts in the First_Tier (802) (e.g. the least trusted user accounts) may be classified as bot accounts (812). Therefore, user accounts in the First_Tier (802) may not be able to send messages (816), provide feedback (818), or the like. In some embodiments, user accounts in the First_Tier may be quarantined, deleted, or the like.

User accounts in the Second_Tier (804) may be classified as human accounts (814), but may not be trusted enough to perform other message related sub-actions, such as sending messages (816). These user accounts may include human accounts that are used to send spam messages. Thus, in some embodiments, user accounts in the Second_Tier (804) may be blocked from sending messages (816), providing feedback (818), or the like. Similarly, these user accounts may be quarantined, deleted, or the like.

User accounts in the Third_Tier (806) may be classified as human accounts (814) and may be trusted to send messages (816). However, input, such as message feedback, from these user accounts may not be trusted. For example, user accounts in the Third_Tier (806) may include user accounts that incorrectly identify messages as spam. Therefore, these user accounts may be able to send messages (816), but may not be able to provide feedback (818) and/or any feedback that is provided may be ignored and/or discarded.

User accounts in the Fourth_Tier (808) may be classified as human accounts (814) and may be trusted to send messages (816) and to provide feedback on received messages (818). Similarly, User accounts in the Fifth_Tier (810) may the most trusted human accounts (814) for the given action. Therefore, not only can a user account in the Fifth_Tier (810) send messages (816) and provide feedback (818), the system may use the feedback to modify a spam filter (820), such as, for example, adding a message to a spam listing. Therefore, in some embodiments, the more trusted a user account is (e.g. a higher a user account trustworthiness score), the more sub-actions and/or privileges the user account may be awarded.

It should be noted that embodiments are not to be construed as limited by this non-limiting, non-exhaustive example and other numbers of tiers, actions, privileges, classifications, or the like may be implemented.

The above specification, examples, and data provide a complete description of the manufacture and use of the composition of the invention. Since many embodiments can be made without departing from the spirit and scope of the invention, the invention resides in the claims hereinafter appended.

What is claimed is:

1. A method comprising:
identifying, for a given action by one or more network computing devices, a trusted group of user accounts from a plurality of user accounts using a respective trustworthiness score for the given action assigned to each user account of the plurality, wherein the given action refers to an online activity that is performed by one or more users associated with respective user accounts, each user account's trustworthiness score being determined using inputs received from the each user account for the given action, the trustworthiness score being used to identify the trusted group of user accounts whose input is to be used to classify an item, wherein the item refers to an article on the internet that can have an action performed on it, and to identify other user accounts whose input is to be excluded from classifying the item, the identifying comprising generating an initial trustworthiness score for a user account of the plurality using a trained trustworthiness classifier and a feature set about the user account, the trained trustworthiness classifier comprising a number of machine-implemented algorithms used to evolve behaviors based on input data, the feature set comprising online user behavioral features and static profile features about the user account, wherein the online user behavioral features comprise online activity features and the static profile features comprise user registration features, the initial trustworthiness score for the user account is used at least initially to determine whether or not to include the user account in the trusted group of user accounts for the given action;
monitoring, by the one or more network computing devices, inputs for the given action and about the item, the inputs about the item from the trusted group for the given action are used to classify the item as one of spam and non-spam, such that any input about the item from other than the trusted group of user accounts formed for the given action is excluded from being used to classify the item; and
evolving, by the one or more network computing devices, the trusted group based on modified trustworthiness scores of the plurality of user accounts for the given action, each modified trustworthiness score is determined, in part, by a comparison of an input about the item from a corresponding user account and inputs about the item from other user accounts in the plurality of user accounts, wherein evolving the trusted group further comprises at least one of moving at least one user account into the trusted group that previously was not in the trusted group and moving at least one user account out of the trusted group that was previously in the trusted group.

2. The method of claim 1, wherein the online activity features of the online user behavioral features comprising at least one of online browsing activity, electronic mail transactions and address book entries, and the user registration features of the static profile features comprising at least one of user preferences, age, gender and occupation.

3. The method of claim 1, wherein the given action is one of a plurality of actions, participation in more than one action of the plurality of actions results in a user account of the plurality of user accounts being assigned multiple trustworthiness scores, each trustworthiness score assigned to a given user account is associated with a different action of the plurality of actions, and wherein a different trusted group is identified for each action in the plurality of actions.

4. The method of claim 1, further comprising:
modifying the trustworthiness score assigned to each user account, comprising:
increasing a trustworthiness score of the given user account when input from a given user account matches the input from the other user accounts; and
decreasing the trustworthiness score of the given user account when input from a given user account does not match the input from the other user accounts.

5. The method of claim 1, further comprising:
modifying the trustworthiness score assigned to each user account, comprising:
increasing a trustworthiness score of the given user account when input from a given user account matches the input from the other user accounts and the input from the given user account matches a result from an anti-spam system; and
decreasing the trustworthiness score of the given user account when the input from the given user account is different than the input from other user accounts and the input from the given user account is different than the result from the anti-spam system.

6. The method of claim 1, further comprising:
when a trustworthiness score of a given user account is below a threshold value, identifying the given user account as a robot account; and
identifying the given user account as a human account when a trustworthiness score of the given user account is not below the threshold value.

7. The method of claim 1, further comprising: modifying a spam filter based on the inputs from the trusted group.

8. A network device comprising:
a transceiver for communicating with at least one client device over a network;
a processor; and
a storage medium for tangibly storing thereon program logic for execution by the processor, the stored program logic comprising:
identifying logic executed by the processor for identifying, for a given action, a trusted group of user accounts from a plurality of user accounts using a respective trustworthiness score for the given action assigned to each user account of the plurality, wherein the given action refers to an online activity that is performed by one or more users associated with respective user accounts, each user account's trustworthiness score being determined using inputs received from the each user account for the given action, the trustworthiness score being used to identify the trusted group of user accounts whose input is to be used to classify an item and to identify other user accounts whose input is to be excluded from classifying the item, wherein the item refers to an article of the internet that can have an action performed on it, the identifying comprising generating an initial trustworthiness score for a user account of the plurality using a trained trustworthiness classifier and a feature set about the user account, the trained trustworthiness classifier comprising a number of machine-implemented algorithms used to evolve behaviors based on input data, the feature set comprising online user behavioral features and static profile features about the user account, wherein the online user behavioral features comprise online activity features and the static profile features comprise user registration features, the initial trustworthiness score for the user account is used at least initially to determine whether or not to include the user account in the trusted group of user accounts for the given action;

monitoring logic executed by the processor for monitoring inputs for the given action and about the item, the inputs about the item from the trusted group for the given action are used to classify the item as one of spam and non-spam, such that any input about the item from other than the trusted group of user accounts formed for the given action is excluded from being used to classify the item; and evolving logic executed by the processor for evolving the trusted group based on modified trustworthiness scores of the plurality of user accounts for the given action, each modified trustworthiness score is determined, in part, by a comparison of an input about the item from a corresponding user account and inputs about the item from other user accounts in the plurality of user accounts, wherein evolving the trusted group further comprises at least one of moving at least one user account into the trusted group that previously was not in the trusted group and moving at least one user account out of the trusted group that was previously in the trusted group.

9. The network device of claim 8, wherein the given action is one of a plurality of actions, participation in more than one action of the plurality of actions results in a user account of the plurality of user accounts being assigned multiple trustworthiness scores, each trustworthiness score assigned to a given user account is associated with a different action of the plurality of actions, and wherein a different trusted group is identified for each action in the plurality of actions.

10. The network device of claim 8, wherein the program logic for execution by the processor further comprises:
modifying logic executed by the processor for modifying the trustworthiness score assigned to each user account, comprising:
increasing logic executed by the processor for increasing a trustworthiness score of the given user account when input from a given user account matches the input from the other user accounts; and decreasing logic executed by the processor for decreasing the trustworthiness score of the given user account when the input from the given user account does not match the input from the other user accounts.

11. The network device of claim 8, wherein the program logic for execution by the processor further comprising:
identifying logic executed by the processor for identifying the given user account as a robot account when a trustworthiness score of a given user account is below a threshold value, identifying the given user account as a robot account; and
identifying logic executed by the processor for identifying the given user account as a human account when the trustworthiness score of the given user account is not below the threshold value.

12. The network device of claim 8, wherein the online activity features of the online user behavioral features comprising at least one of online browsing activity, electronic mail transactions and address book entries, and the user registration features of the static profile features comprising at least one of user preferences, age, gender and occupation.

13. A non-transitory computer-readable storage device having computer-executable instructions stored thereon such that when the storage device is accessed by a computing device, the instructions are executable by the computing device to perform actions, comprising:
identifying, for a given action, a trusted group of user accounts from a plurality of user accounts using a respective trustworthiness score for the given action assigned to each user account of the plurality, wherein the given action refers to an online activity that is performed by one or more users associated with respective user accounts, each user account's trustworthiness score being determined using inputs received from the each user account for the given action, the trustworthiness score being used to identify the trusted group of user accounts whose input is to be used to classify an item, wherein the item refers to an article of the internet that can have an action performed on it, and to identify other user accounts whose input is to be excluded from classifying the item the identifying comprising generating an initial trustworthiness score for a user account of the plurality using a trained trustworthiness classifier and a feature set about the user account, the trained trustworthiness classifier comprising a number of machine-implemented algorithms used to evolve behaviors based on input data, the feature set comprising online user behavioral features and static profile features about the user account, wherein the online user behavioral features comprise online activity features and the static profile features comprise user registration features the initial trustworthiness score for the user account is used at least initially to determine whether or not to include the user account in the trusted group of user accounts for the given action;

monitoring inputs for the given action and about an item, the inputs about the item from the one or more trusted groups for the given action are used to classify the item as one of spam and non-spam, such that any input about the item from other than the trusted group of user accounts formed for the given action is excluded from being used to classify the item; and evolving the trusted group based on modified trustworthiness scores of the plurality of user accounts for the given action, each modified trustworthiness score is determined, in part, by a comparison of an input about the item from a corresponding user account and inputs about the item from other user accounts in the plurality of user accounts, wherein evolving the trusted group further comprises at least one of moving at least one user account into the trusted group that previously was not in the trusted group and moving at least one user account out of the trusted group that was previously in the trusted group.

14. The non-transitory computer-readable storage device of claim 13, wherein the online activity features of the online user behavioral features comprising at least one of online browsing activity, electronic mail transactions and address book entries, and the user registration features of the static profile features comprising at least one of user preferences, age, gender and occupation.

15. The non-transitory computer-readable storage device of claim 13, wherein the given action is one of a plurality of actions, participation in more than one action of the plurality of actions results in a user account of the plurality of user accounts being assigned multiple trustworthiness scores, each trustworthiness score assigned to a given user account is associated with a different action of the plurality of actions, and wherein a different trusted group is identified for each action in the plurality of actions.

16. The non-transitory computer-readable storage device of claim 13, wherein the one or more other network devices further enables actions, the actions comprising:
modifying the trustworthiness score assigned to each user account, comprising:
when input from a given user account matches the input from the other user accounts, increasing a trustworthiness score of the given user account; and decreasing the trustworthiness score of the given user account when input from the given user account does not match the input from the other user accounts.

17. The non-transitory computer-readable storage device of claim 13, wherein the one or more other network devices further enables actions, the actions comprising:
when a trustworthiness score of a given user account is below a threshold value, identifying the given user account as a robot account; and
identifying the given user account as a human account when the trustworthiness score of the given user account is not below the threshold value.

\* \* \* \* \*